(12) United States Patent
Wood et al.

(10) Patent No.: US 11,970,419 B2
(45) Date of Patent: Apr. 30, 2024

(54) COHERENT IMAGING FIBRE AND METHOD

(71) Applicant: THE UNIVERSITY COURT OF THE UNIVERSITY OF EDINBURGH, Edinburgh (GB)

(72) Inventors: Harry A. C. Wood, Bath (GB); James M. Stone, Bath (GB); Kerrianne Harrington, Bath (GB)

(73) Assignee: The University Court of the University of Edinburgh, Edinburgh (GB)

( * ) Notice: Subject to any disclaimer, the term of this patent is extended or adjusted under 35 U.S.C. 154(b) by 309 days.

(21) Appl. No.: 17/251,088

(22) PCT Filed: Jun. 20, 2019

(86) PCT No.: PCT/GB2019/000087
§ 371 (c)(1),
(2) Date: Dec. 10, 2020

(87) PCT Pub. No.: WO2019/243760
PCT Pub. Date: Dec. 26, 2019

(65) Prior Publication Data
US 2021/0253468 A1 Aug. 19, 2021

(30) Foreign Application Priority Data
Jun. 20, 2018 (GB) ...................... 1810095

(51) Int. Cl.
*C03B 37/012* (2006.01)
*C03B 37/028* (2006.01)

(52) U.S. Cl.
CPC ...... *C03B 37/01214* (2013.01); *C03B 37/028* (2013.01); *C03B 2203/14* (2013.01); *C03B 2203/40* (2013.01)

(58) Field of Classification Search
None
See application file for complete search history.

(56) References Cited

U.S. PATENT DOCUMENTS 6,301,420 B1 * 10/2001 Greenaway ....... C03B 37/01205
385/115
2003/0026567 A1 2/2003 Cryan et al.
(Continued)

FOREIGN PATENT DOCUMENTS

EP 3375367 A1 9/2018
JP S61088206 A 5/1986
(Continued)

OTHER PUBLICATIONS

International Preliminary Report on Patentability for PCT Application No. PCT/GB2019/000087, dated Dec. 30, 2020.
(Continued)

*Primary Examiner* — Lisa L Herring
(74) *Attorney, Agent, or Firm* — Locke Lord LLP; Christopher J. Capelli

(57) ABSTRACT

A method of forming an imaging fibre apparatus comprises: •arranging core rods 102 and cladding rods 104 to form at least one primary stack 100a, each primary stack 100a comprising a plurality of core rods 102 and cladding rods 104 arranged in a stack arrangement thereby to form a plurality of core regions within a cladding region; •performing a drawing process to form a plurality of drawn stacks from the at least one primary stack; •wherein the plurality of core rods and cladding rods are further arranged to have a selected shape such that the plurality of stacks stack together in a desired arrangement and wherein the stack arrangement comprises an at least partial outer layer of cladding rods thereby to provide separation between core regions of respective adjacent stacks when stacked in the desired arrangement, the method further comprising: •stacking the
(Continued)

plurality of drawn stacks together in the desired arrangement to form a further stack; •drawing the further stack; and •using the drawn further stack to form an imaging fibre apparatus.

21 Claims, 10 Drawing Sheets

(56) References Cited

U.S. PATENT DOCUMENTS

| 2004/0105641 | A1* | 6/2004 | Russell | G02B 6/02347 |
| | | | | 65/393 |
| 2004/0114891 | A1* | 6/2004 | Guerra | A61B 1/00165 |
| | | | | 385/116 |
| 2004/0151454 | A1* | 8/2004 | Fajardo | G02B 6/02333 |
| | | | | 385/126 |
| 2007/0183727 | A1* | 8/2007 | Strack | G02B 6/4475 |
| | | | | 385/100 |
| 2017/0123146 | A1 | 5/2017 | Chen et al. | |

FOREIGN PATENT DOCUMENTS

| JP | 2000126113 A | 5/2000 |
| JP | 2002537575 A | 11/2002 |
| JP | 2006103995 A | 4/2006 |
| JP | 2017075061 A | 4/2017 |

OTHER PUBLICATIONS

Y. Matsuura and K. Naito, "Flexible hollow optical fiber bundle for infrared thermal imaging" Biomed. Opt. Express 2, 65 (2011).
International Search Report and Written Opinion for PCT Application No. PCT/GB2019/000087 dated Sep. 26, 2019.
Youngchan Kim et al: "Semi-random multicore fibre design for adaptive multiphoton endoscopy", Optics Express, vol. 26, No. 3, Feb. 2, 2018 (Feb. 2, 2018), p. 3661, XP055622665, DOI: 10.1364/0E.26.003661 2.1 Fibre fabrication on p. 3663; figure 1.
Van Eijkelenborg, M.A., "Imaging with microstructured polymer fibre," Opt. Express 12, 342-346 (2004).
Zhao, J., et al., "Image Transport Through Meter-Long Silica-Air Disordered Optical Fiber." Scientific Reports (2018) 8:3065 | D01:10.1038/s41598-018-21480-0. Published online: Feb. 15, 2018.
Kobayashi, T, et al., "Multi-element hollow-core anti-resonant fiber for infrared thermal imaging," Opt. Express24, 26565-26574 (2016).
Ming-Leung, V.T., et al., "Superlattice Microstructured Optical Fiber," Materials 7, No. 6, 4567-4573 (2014).
Michaille L., et al., "Multicore Photonic Crystal Fiber Lasers for High Power/Energy Applications," IEEE 15, 328-336 (2009).
Office Action for the corresponding Japanese Application No. JP2020570973, dated May 9, 2023.
European Office Action for European Application No. EP19748878.6, dated Jul. 26, 2023.

* cited by examiner (a)            (b)

COHERENT IMAGING FIBRE AND METHOD

This application is the U.S. National Stage of PCT International Application No. PCT/GB2019/000087, filed Jun. 20, 2019, which claims priority from Application GB1810095.8 filed on Jun. 20, 2018 in the United Kingdom. The entire disclosures of these applications are incorporated herein by reference in their entirety.

FIELD

The present invention relates to an optical fibre apparatus, for example a spatially coherent imaging fibre, and a method of making an optical fibre apparatus.

BACKGROUND

A coherent imaging fibre (which may be referred to as a fibre bundle) may comprise many thousands of light guiding cores, each of which transmits a part of an image along the fibre length. Each core may act as a pixel to build up an image.

In order to build up high resolution images, the cores of the fibre may be placed close together. There may be a limit to how close to each other the cores may be placed. When cores get too close together, light in one core may couple out of that core and into another core. Such coupling of light between cores may degrade a transmitted image.

One method of mitigating the coupling effect may be to increase the index contrast between cores and the surrounding cladding, commonly measured using the numerical aperture (NA) of the fibre. Known fibres may obtain NA greater than 0.3 by using expensive glass doping and tempering techniques.

Since the late 90s photonic crystal fibres (PCF) with an NA in excess of 0.7 have existed for applications such as supercontinuum generation by using hollow capillaries to form a cladding with an effective index close to that of air.

Known fibres (for example those available from Schott AG) involve stacked arrays of uniform cores made from specialty glasses with high index compared with the cladding glasses, providing a high index contrast. Schott AG also provide fibres having absorbing interstitial elements or leached fibre bundles where the interstitial glass is etched away, leaving a bundle of isolated cores joined at either end of the fibre and separated by air along the fibre length.

Fujikura Ltd produce imaging fibres based on doped silica glasses. The cross talk may be suppressed by using high NA (~0.4) step cores with a random variation in size and random spatial distribution. It may be difficult to acquire the raw materials to fabricate such a fibre economically. This may result in high manufacturing costs.

Zhao et al. ("Image Transport Through Meter-Long Randomly Disordered Silica-Air Optical Fiber", Scientific Reports (2018)) describes performance of an air-silica imaging fibre based on transverse Anderson localisation. The structure of the fibre is a random transverse arrangement of silica glass and air. The fibre may be spatially coherent along the length. Zhao et al. also demonstrate 20 μm resolution through a 90 cm length of fibre, bent to 20 cm radius with 405 nm.

Eijkelenborg ("Imaging with microstructured polymer fibre", Opt. Express 12, 342-346 (2004)) describes a square array of 112 air holes, guiding light in polymer cores between air holes or guiding light in air channels themselves. The fibres are not stacked but drawn from a monolithic structured preform. The fibre is made of polymer and contains 91 solid cores and 112 air holes. Imaging with 42 μm resolution is demonstrated.

Kobayashi ("Multi-element hollow-core anti-resonant fibre for infrared thermal imaging," Opt. Express 24, 26565-26574 (2016)) describes an imaging fibre consisting of an array of 245 anti-resonant hollow optical fibres designed for endoscopic infrared thermal imaging. Light is guided by anti-resonance. Kobayashi operates at greater than 2 μm wavelength with resolution of approximately 500 μm through 90 cm of fibre.

Ming-Leung et al. ("Superlattice Microstructured Optical Fibre," Materials 7, no. 6, 4567-4573 (2014)) describes fabrication and use of a super-lattice PCF. The PCF has only one core. Multi-stacking is performed to provide a super-lattice cladding. The first stack consists of inner capillaries surrounded by solid rods.

Michaille et al. ("Multicore Photonic Crystal Fibre Lasers for High Power/Energy Applications," IEEE 15, 328-336 (2009)) describes multicore PCF structures for high power laser applications. Each fibre has fewer than 40 cores.

SUMMARY

In a first aspect of the invention, there is provided a method of forming an optical fibre apparatus comprising: arranging core rods and cladding rods to form at least one primary stack, each primary stack comprising a plurality of core rods and cladding rods arranged in a stack arrangement thereby to form a plurality of core regions within a cladding region; performing a drawing process to form a plurality of drawn stacks from the at least one primary stack; wherein the plurality of core rods and cladding rods are further arranged to have a selected shape such that the plurality of stacks stack together in a desired arrangement and wherein the stack arrangement comprises an at least partial outer layer of cladding rods thereby to provide separation between core regions of respective adjacent stacks when stacked in the desired arrangement, the method further comprising: stacking the plurality of drawn stacks together in the desired arrangement to form a further stack; drawing the further stack; and using the drawn further stack to form the optical fibre apparatus. The optical fibre apparatus may comprise an imaging fibre apparatus.

The above method may allow an optical fibre having an improved resolution and/or a broad functional spectral range to be formed. The method may also provide a simplified or efficient method for forming an optical fibre apparatus.

The drawing process may comprise drawing the at least one primary stack to form at least one drawn primary stack and cutting the at least one drawn primary stack.

The cladding rods may comprise capillary tubes such that the cladding region comprises at least in part an air cladding region.

The stack arrangement may be such that one or more edges of respective adjacent stacks co-operate in the desired arrangement to provide said separation between core regions of said respective stacks.

The stack arrangement may be such that each stack comprises at least one outer edge comprising at least one cladding rod.

The stack arrangement may be such that each stack comprises one or more outer edges of cladding rods.

The stack arrangement may be such that each stack comprises an outer layer of cladding rods.

Each of the plurality of drawn stacks may have substantially the same stack arrangement and/or selected shape.

The stack arrangement and/or the desired arrangement may comprise a regular array of core rods and cladding rods.

Stacking stacks in the desired arrangement may further comprise controlling or changing the orientation of one or more of the plurality of drawn stacks.

The stack arrangement may be such that the further stack comprises a substantially homogenous distribution of the plurality of core regions within the cladding region.

The stack arrangement may be such that the arranged stack comprises a non-symmetrical distribution of the plurality of core regions within the cladding region.

The stack arrangement may be such that the arranged stack comprises a non-symmetrical distribution of core rods and cladding rods and the desired arrangement may be is such that the further stack comprises a symmetrical distribution of core regions.

The stack arrangement may be such that the further stack comprises a repeating pattern of core rods and cladding rods.

The selected shape may comprise an irregular shape.

The selected shape may comprise at least one of a square, a rectangle, a rhombus, a parallelogram, a hexagon, a regular polygon.

The stack arrangement may comprise at least one of:
  a hexagonal packing arrangement, a honeycomb arrangement, a hexagonal lattice arrangement, a staggered row arrangement For each stack, the respective plurality of core rods and respective plurality of cladding rods may be arranged in the stack arrangement such that each core region is at least partially surrounded by cladding rods.

The plurality of core regions may comprise one or more inner core regions and one or more edge core regions and the stack configuration may comprise surrounding the one or more inner core regions with cladding rods.

The stack arrangement may be such that each core rod is separated from its nearest neighbour core rod by at least one cladding rod.

Each of the plurality of core regions may be formed from a single core rod.

Each core rod may comprise at least one of silica, Ge-doped silica, Fluorine doped silica, boron doped silica, Aluminium doped silica, silicate glass.

Each cladding rod may comprise at least one of: silica, Ge-doped silica, Fluorine doped silica, boron doped silica, Aluminium doped silica, silicate glass.

Each of the plurality of core regions may comprise a non-uniform refractive index distribution The stack arrangement and/or desired arrangement may be such that, for each core region, the nearest-neighbour core region for said core region comprises a different refractive index distribution to said core region.

The stack arrangement and/or desired arrangement may be such that, for each core region, the nearest-neighbour core region for said core region comprises a different effective refractive index to said core region.

The stack arrangement and/or desired arrangement may be such that, for each core region, the next to nearest-neighbour core region for said core region comprises a core region comprising substantially the same refractive index distribution or effective refractive index.

Each core region may have an inner core region and an outer core region. The stack arrangement may be such that for each core rod the nearest-neighbour core rod for said core rod comprises a different ratio of inner core region size to outer core region size.

The inner and outer core regions may be defined by the boundaries of the internal refractive index distribution, and the boundary to their cladding regions respectively.

At least one of the inner core region and outer core region may comprise a doped core region.

The method may further comprise: obtaining the core rods by drawing at least one preform.

The rods may have outer sizes between 0.5 mm and 10 mm, optionally between 1 mm and 5 mm.

A width of each stack may be between 10 mm and 100 mm.

A numerical aperture of each rod may be less than 0.50, optionally less than 0.45.

Each core rod may comprise a core and a cladding.

The method may further comprise performing a sealing process on an end region of the optical fibre.

The sealing process may comprise at least one of:
  plugging holes between rods at the end region using an at least partially transparent plugging material, for example, resin and/or glue and/or glass and/or sol-gel;
  collapsing/compressing the rods at the end region, for example, using a fibre tapering rig;
  melting the end region;
  polishing the end region.

Said glass may have a low melting temperature.

The method may further comprise:
  controlling a first drawing temperature at which the drawing process of the at least one primary stack is performed and/or controlling a further drawing temperature at which the drawing of the further stack is performed.

The first drawing temperature may be between 1800 and 2000 degrees Celsius. The first drawing temperature may be between 1850 and 1950 degrees Celsius. The first drawing temperature may be between 1890 and 1910 degrees Celsius.

The further drawing temperature may be between 1800 and 2000 degrees Celsius. The further drawing temperature may be between 1850 and 1950 degrees Celsius. The further drawing temperature may be between 1890 and 1910 degrees Celsius.

The method may further comprise:
  controlling a first drawing tension at which the drawing process of the at least one primary stack is performed and/or controlling a further drawing tension at which the drawing of the further stack is performed.

The first drawing tension may be at least 300 gram-force. The first drawing tension may be between 300 and 1000 gram-force. The first drawing tension may be between 500 and 800 gram-force.

The further drawing tension may be at least 300 gram-force. The first drawing tension may be between 300 and 1000 gram-force. The further drawing tension may be between 500 and 800 gram-force.

According to a second aspect of the invention, which may be provided independently, there is provided an optical fibre apparatus comprising core regions within a cladding region, wherein the core regions are separated by cladding rods arranged to at least partially surround said core regions.

The core regions and cladding region may be formed from an arrangement of core rods and cladding rods in a repeating pattern of unit cells, each unit cell comprising at least one core rod surrounded by cladding rods.

The core regions may be arranged such that for each core region, the nearest-neighbour core region for said core region has a different refractive index distribution.

The core regions may be arranged such that for each core region, the next to nearest-neighbour core region for said core region has substantially the same refractive index distribution.

The optical fibre apparatus may be configured for use in imaging.

The apparatus may be configured to transmit at least one of visible light, ultraviolet light, infrared light.

An optical coupler may be coupled to the optical fibre apparatus and to a light source and/or light detector.

In a further aspect of the invention, which may be provided independently, there may be provided a fibre assembly comprising: an optical fibre apparatus according to the second aspect of the invention or as described herein or as formed using a method according to the first aspect of the invention or as described herein; at least one further optical fibre and/or at least one capillary tube; and a package containing the imaging fibre apparatus and the at least one further optical fibre and/or at least one capillary tube. The package may comprise, for example, a glass or polymer tube. The optical fibre apparatus may comprise an imaging fibre apparatus.

The fibre assembly may further comprise an optical coupler configured to couple the optical fibre apparatus to a light source and/or light detector.

The fibre assembly may further comprise a further coupler configured to couple the or each further optical fibre to at least one sensing apparatus.

The fibre assembly may further comprise a connector configured to couple the or each capillary tube to a fluid insertion device, for example a syringe.

A distal end of the fibre assembly may be configured for insertion into a human or animal subject.

Any feature in one aspect of the invention may be applied to other aspects of the invention, in any appropriate combination. For example, apparatus features may be applied as method features and vice versa.

BRIEF DESCRIPTION OF THE DRAWINGS

Embodiments of the invention are now described, by way of non-limiting example, and are illustrated in the following figures, in which:—

DETAILED DESCRIPTION

An imaging fibre is hereby described, for example a spatially coherent imaging fibre, and a method of making the imaging fibre. The formed imaging fibre has a plurality of core regions within a cladding region. The cladding region of the imaging fibre is formed from hollow air-filled tubes or capillaries. The fibre is formed such that the plurality of core regions are arranged within the cladding region such that the core regions are separated by the cladding rods. The formed imaging fibre has a longitudinal length with a first end for receiving light and second, end for transmitting light.

In use, light is introduced to the first end of the imaging fibre and guided to the second end of the imaging fibre. Light is transmitted through the imaging fibre via the core regions. Light travelling through the fibre is substantially confined to travel through the core regions by the cladding regions. The core regions may also be referred to as light confining regions.

Figure 1:
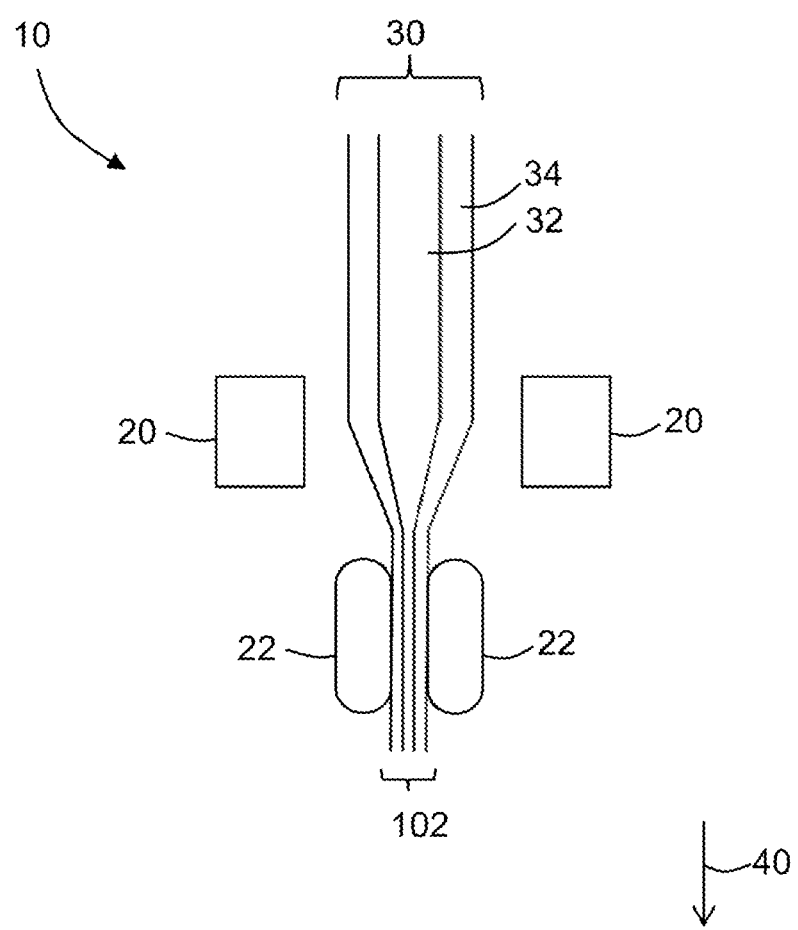
FIG. 1 is a schematic illustration of a fibre drawing apparatus.

FIG. 1 is a schematic illustration of a fibre drawing apparatus 10 comprising heating elements 20 and a fibre pulling mechanism 22. The fibre drawing apparatus 10 is used to form the imaging fibre described above. Other components of the fibre drawing apparatus have been omitted for clarity. FIG. 1 is not illustrated to scale.

In the present embodiment, the fibre drawing apparatus 10 is an item of telecommunications equipment and is configured to control diameter of a drawn fibre to within microns. In other embodiments, any suitable fibre drawing apparatus may be used.

The fibre drawing apparatus 10 is configured to draw a fibre preform 30 comprising a core portion 32 and a cladding portion 34.

In some embodiments, the core portion 32 of the fibre has no doped portion. In some embodiments, the core portion 32 has a doped portion. In some embodiments, the core portion 32 has an inner core portion and an outer core portion, wherein the inner core portion has a first refractive index distribution and/or effective refractive index and the outer core portion has a second, different, refractive index distribution and/or effective refractive index.

To draw the fibre preform 30, the fibre preform is pulled by the pulling mechanism in a direction indicated by arrow 40 (which in FIG. 1 is downwards).

The fibre preform 30 is heated by heating elements 20 so that it becomes soft and may be drawn. The fibre preform 30 is pulled by the pulling mechanism 22 so that it increases in length and decreases in cross-section. The output of the fibre pulling apparatus 10 is a core rod 102 having substantially the same ratio of core size to cladding size as the original fibre preform 30, but a much smaller cross-section. The pulling mechanism comprises a pulling belt (not shown).

The ratio of core size to cladding size (for example, a ratio of core diameter to cladding diameter) may be referred to as a core to cladding ratio. The cladding size may also be referred to as an outer size.

The fibre drawing apparatus 10 is further configured to draw a cladding preform (not shown in FIG. 1) to form a cladding rod. The cladding preform has a central portion and a cladding portion. In this embodiment, the cladding preform is a F 300™ silica glass tube which has a central portion which is an empty channel surrounded by the cladding portion. As known to one skilled in the art, F 300™ is an example of a low OH synthetic pure silica material, commercially available from Heraeus Conamic. When being drawn, the cladding preform is positioned in the same place occupied by preform 30 in the fibre drawing apparatus.

To draw the cladding preform, the cladding preform is pulled by the pulling mechanism in a direction indicated by arrow 40 (which in FIG. 1 is downwards).

The cladding preform is heated by heating elements 20 so that it becomes soft and may be drawn. The cladding preform is pulled by the pulling mechanism 22 so that it increases in length and decreases in cross-section. The output of the fibre pulling apparatus 10 is a cladding rod 104 having substantially the same ratio of cladding size to inner size as the original fibre preform 30, but a much smaller cross-section.

In this embodiment, the same apparatus is shown for drawing the core preform and the cladding preform. In some embodiments, a different apparatus is used.

Figure 2:
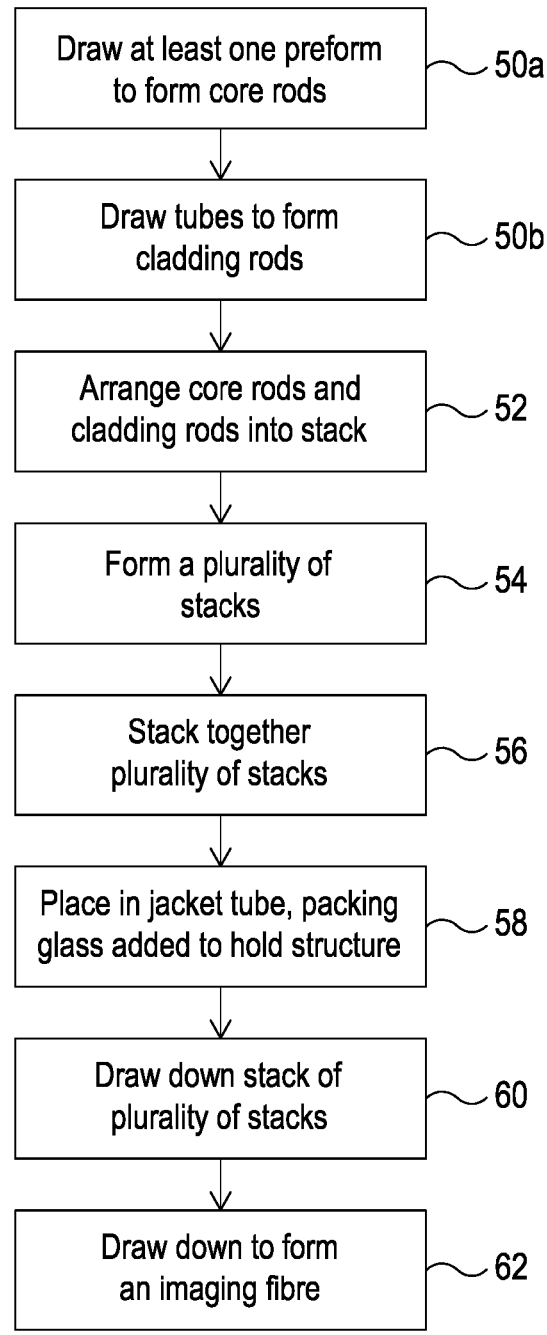
FIG. 2 is a flow chart illustrating in overview a method of an embodiment.

FIG. 2 is a flow chart illustrating, in overview, a method of forming an optical fibre apparatus in accordance with an embodiment. The optical fibre apparatus is a multiple core optical fibre apparatus. In this embodiment, the formed optical fibre apparatus is a coherent imaging fibre comprising 11,343 cores arranged in a lattice-type shape with air-filled cladding rods. In other embodiments, the optical fibre apparatus may be any suitable optical fibre apparatus comprising any number of cores, for example comprising hundreds, thousands, or tens of thousands of cores.

The produced fibre has a, plurality of core regions within a cladding region. The core regions of the fibre are separated by cladding rods, such that each core region provides an air-clad light guide. In use, light is introduced to a first end of the fibre apparatus and propagates to a second end of the fibre apparatus. The light is confined to the plurality of core regions of the imaging fibre by the cladding rods. In some embodiments, each core region is formed from a single core rod. In alternative embodiments, core regions may be formed by more than one core rod.

Figure 3:
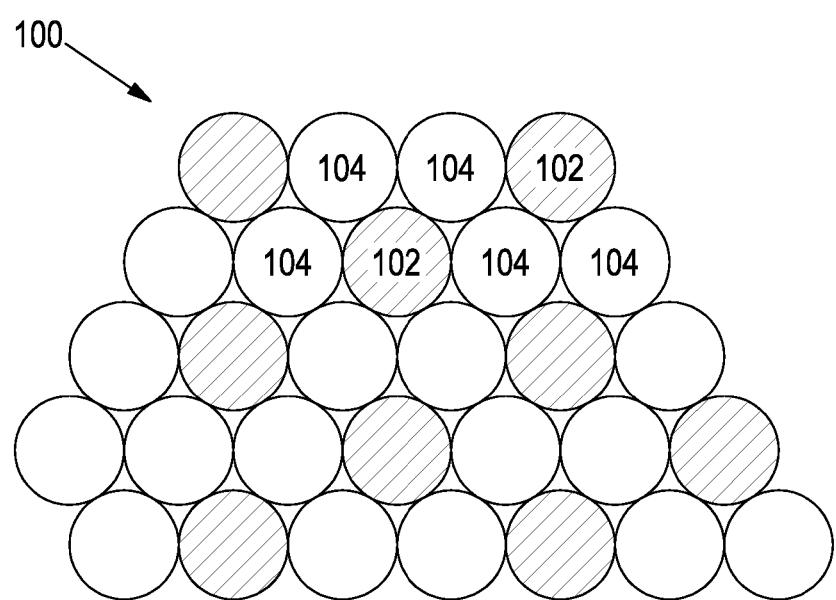
FIG. 3 is a schematic illustration of part of a stacking arrangement of cladding rods and core rods.

At stage 50a of FIG. 2, fibre drawing apparatus 10 is used to draw one or more types of fibre preform 30 to form core rods, depicted by reference 102 in FIG. 3. Individual core rods with low index cladding are drawn from the single type of fibre preform. In some embodiments, each core rod is drawn from a single type of fibre preform comprising one or more pieces of fibre preform each having the same material composition, core diameter and cladding diameter. In some embodiments, core rods are drawn from more than one type of fibre preform that have, for example, different material composition, core diameter and/or cladding diameter.

In the present embodiment, fibre preform 30 is a multimode telecoms grade preform which is formed from silica. The fibre preform 30 is designed for mass production.

Fibre preform 30 has an outer diameter of 25 mm and a length of 50 cm. Fibre preform 30 comprises a cladding portion 34 characterised by a first refractive index and a core portion 32 characterised by a peak refractive index.

In this embodiment, the core rod are made of silica glass. In this embodiment, the core portion of the fibre preform 30 is a Germanium doped step index core portion. In other embodiments, the fibre preform 30 has a graded index with, for example, a parabolic graded index profile. In some embodiments, the fibre preform 30 has no doped portion.

The fibre preform 30 may be considered to be an off-the-shelf component having a standard size.

The fibre preform 30 is drawn down to a size using the fibre drawing apparatus 10. For example, fibre drawing apparatus 10 may draw down a length of fibre preform 30 to a first size to form a plurality of core rods 102 by operating the fibre drawing apparatus 10 at a first speed and cutting off 1 metre lengths of rod to form a first plurality of core rods 102. In other embodiments, any lengths of rods may be used.

At stage 50b of FIG. 2, fibre drawing apparatus 10 is used to draw one of more types of cladding preform (not shown) to form cladding rods, depicted by reference 104 in FIG. 3. In some embodiments, the cladding rods are capillary tubes such that cladding regions formed are air-cladding regions. In the following, cladding rods may also be referred to as capillaries. In some embodiments, the cladding region formed has an effective refractive index substantially equal to that of air.

Individual cladding rods with low index cladding are drawn from the single type of cladding preform. In some embodiments, each cladding rod is drawn from a single type of cladding preform comprising one or more pieces of cladding preform each having the same material composition, inner diameter and cladding diameter. In some embodiments, cladding rods are drawn from more than one type of fibre preform, for example, the more than one type of fibre preform having different material composition, core diameter and/or cladding diameter.

In the present embodiment, the cladding preform is a F 300™ silica glass tube. The cladding preform is designed for mass production. Cladding preform has an outer diameter of 25 mm and a length of 1 metre.

The cladding preform is drawn down to a size using fibre drawing apparatus 10. For example, fibre drawing apparatus 10 may draw down a length of fibre preform 30 to a first size to form a plurality of cladding rods 104 by operating the fibre drawing apparatus 10 at a second speed and cutting off 1 metre lengths of cladding rod to form the first plurality of cladding rods 102. In other embodiments, any lengths of rods may be used.

At stage 50a, the core preform is drawn to form a core rod 102 having a first diameter and at stage 50b, the cladding preform is drawn to form a cladding rod 104 that has a diameter substantially equal to the first diameter. In some embodiments, the core rods and cladding rods are drawn to have equal diameters which may allow stacking. In other embodiments, in other stacking arrangements, the core rods and cladding rods may have different diameters to each other.

In some embodiments, the core and/or cladding rods have an outer diameter in the range 0.5 mm to 10 mm. In some embodiments, the core and/or cladding rods have an outer diameter in the range 1 mm and 5 mm. In the present embodiment, the cores and cladding rods have an outer diameter of 1.85 mm.

In other embodiments, any suitable drawing process and drawing apparatus may be used. For example, a fibre drawing process may be as described at page 8 of An Introduction to Fibre Optic Imaging, Schott North America, Second Edition, Schott, 2007.

In the description below, references to rods having core sizes and/or outer sizes refer to rods having core sizes and/or outer sizes in a direction perpendicular to a length of the rod, for example rods having core and/or outer diameters, and/or core and/or outer cross-sectional areas.

Any appropriate core rod 102 that is configured for light transmission may be used, for example any rod that is configured to transmit infrared, visible and/or ultraviolet light.

At stage 52 of FIG. 2, a plurality of core rods 102 and a plurality of cladding rods 104, formed at stage 50a and 50b, respectively, are stacked into a hexagonal array to form a stack of rods which may be referred to as a primary stack 100. Primary stacks in accordance with embodiments, are illustrated in FIGS. 4, 5, 6 and 7. We note that the terms arranging and stacking may be used interchangeably to describe the vertical arrangement of elements. The primary stack may also be referred to as a sub-lattice.

The stack can be characterized by its width. As the primary stack is in the shape of a hexagon, a width can be measured between flat edge to opposing flat edge. In some embodiment, this width of the primary stack, before being drawn, is between 10 mm and 100 mm.

FIG. 3 is an illustration of part of a cross-section of the primary stack 100. Only part of the primary stack is shown. Different types of primary stacks, in accordance with embodiments, are illustrated in FIGS. 4, 5, 6 and 7. Each row of the primary stack has core rods 102 and cladding rods 104. The core rods and cladding rods are arranged such that the core rods 102 are separated from each other by the cladding rods. The core rods 102 and cladding rods 104 are stacked such that each core rod is separated from its nearest neighbours by cladding rods. In FIGS. 3 to 7, shaded circles represent core rods and white circles represent cladding rods.

As stated above, FIGS. 4(a), 5(a) and 6(a) and 7 illustrate primary stacking arrangements in accordance with embodiments.

In the present embodiment, the primary stack 100, as illustrated in FIG. 4(a), has 57 core rods 102, each of which is, at least partially, surrounded by cladding rods 104. The primary stack has a hexagonal shape with six sides.

In the present embodiment, the hexagonal primary stack comprises of a plurality of rows of cladding rods 104 and core rods 102. In the present embodiment, the primary stack has 17 rows. For the purposes of describing the arrangement of the primary stack, the primary stack may be considered as having an upper section, a lower section and a mid-section. The upper section is joined to the lower section by the mid-section.

In the present embodiment, the lower section has a first (lowest) row of 9 core rods. Each subsequent (higher) row of the lower section has one additional core and is arranged adjacent to the row below but with a half core rod size off-set. There are 8 rows in the lower section including the first row, such that the eighth and highest row has 16 core rods. The mid-section has one row of 17 core rods also positioned to be off-set by a half core rod size from the eight and highest row of the lower section.

The upper section is a rotated or flipped version of the lower section. The upper section has a first (lowest) row of 17 cores. Each subsequent (higher) row of the upper section has one less core and is arranged to be adjacent to the row below but with a half core size off-set. There are 8 rows in the upper section including the first (lowest) row, such that the eighth and highest row has 9 cores.

When the upper, lower and middle sections are arranged together, the primary stack provides a hexagonal packing arrangement for the core rods 102. The hexagonal packing arrangement is such that all circles representative of the ends of the cores are touching and there is no overlapping between said circles.

In the present embodiment, if the core rods 102 are referred to by the letter A and the cladding rods are referred to by the letter B, in the primary stack, each row may be represented by an array of letters generated using the string "BAB". For example, a 10-rod wide row of core rods and cladding rods may be represented by: BABBABBABB. Considering the rods row-wise, neighbouring core rods in the primary stack are separated by two cladding rods.

In the present embodiment, the primary stack has a hexagonal shape. The primary stack may be considered to have a selected shape, which in the present embodiment is hexagonal. In other embodiments, the selected shape may be any shape, for example a rectangle, parallelogram, rhombus or square. The selected shape may comprise, for example, a polyhedron. In some embodiments, the selected shape is selected such that a primary stack having the selected shape may be stacked with other primary stacks having the selected shape and/or other primary stacks having one or more further selected shapes.

Once the rods 102 and 104 have been stacked as a primary stack 100 the ends of the rods 102, 104 are secured to inhibit relative movement between the rods 102, 104 keeping the primary stack 100 of rods arranged as a hexagon. In the present embodiment, the rods 102, 104 are taped using PTFE tape at both ends by hand. In the present embodiment, the rods 102, 104 may be held together in the hexagonal stack in any suitable manner. In other embodiments, the rods may be secured by fusing at both ends in addition or as an alternative to taping.

In other embodiments, many primary stacks 100 are formed at stage 52 where each primary stack is a hexagonal array of rods 102, 104.

At stages 54 and 56 of FIG. 2, the primary stack 100 which forms a hexagonal array is drawn down using the fibre drawing apparatus 10 to form a plurality of drawn stacks.

Fibre drawing apparatus 10 draws down a length of the primary stack 100 to form a plurality of drawn stacks by operating the fibre drawing apparatus 10 to draw the primary stack to form a drawn primary stack and cutting off 1 metre length of the drawn primary stack to form the plurality of drawn stacks. In other embodiments, any length of drawn primary stack may be used The plurality of drawn stacks may also be referred to as a plurality of stacks or as a plurality of canes. Each drawn stack is a hexagonal array of rods.

The plurality of drawn stacks are then stacked again as described below. At this stage, the drawn stack has a width smaller than the width of the primary stack. In the present embodiment, the total number of stacks 100 that are formed at stage 52 is 199.

In some embodiments, the pulling belt of the pulling mechanism 22 should be suitably prepared before drawing. In some embodiments, the pulling belt should be clean and soft which may avoid crushing any outer cladding rods.

As described above, at stage 54, the formed primary stack 100 is drawn down to form a plurality of drawn stacks. Each drawn stack remains substantially hexagonal after drawing down. In the present embodiment, each drawn stack has a thickness (measured from flat edge to opposing fat edge) of 1.2 mm. This can be compared to the thickness of the primary stack which has a width, at its widest point, of about 31.45 mm.

During the drawing process, the primary stack is heated and rods of each primary stack become fused to neighbouring rods of the primary stack. Interstitial air gaps remain between rods each primary stack.

When drawing the primary stack down at stage 54, choice of furnace temperature is important. If the temperature is too high, and the cladding rods become too hot, the glass may begin to flow and the cladding rods may collapse. If the glass becomes too cold, the drawn stack may break due to tension.

In some embodiments, the temperature is controlled at stage 54 to be in a primary drawing temperature range between 1800 and 2000 degrees Celsius. In other embodiments, the primary drawing temperature range is between 1850 and 1950 degrees Celsius. In other embodiments, the primary drawing temperature range is between 1890 and 191.0 degrees Celsius.

Figure 4:
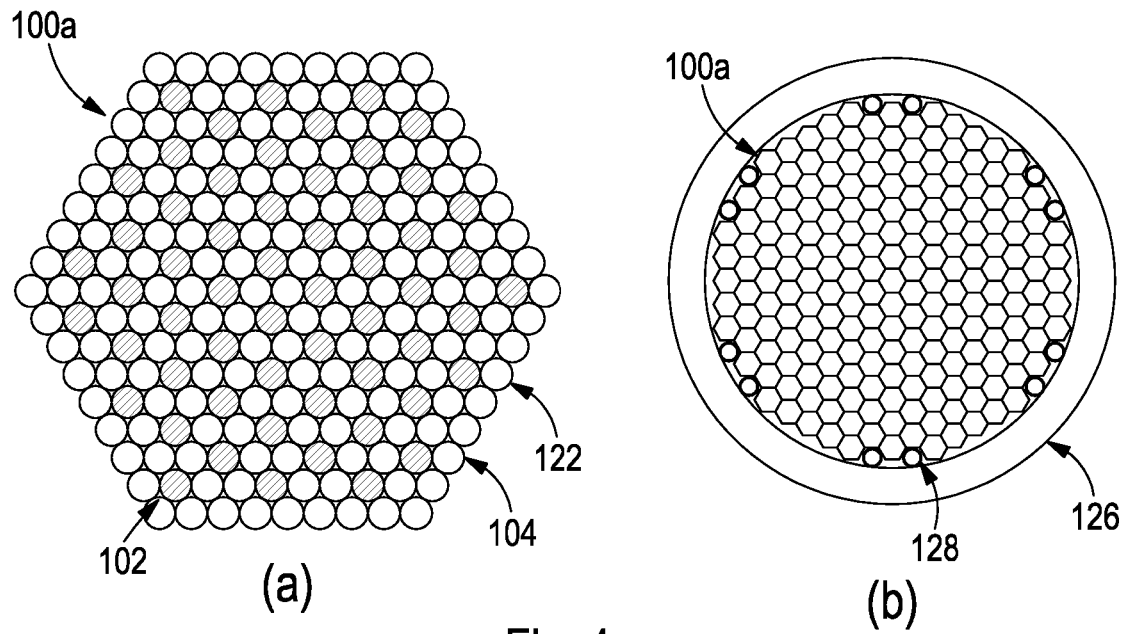
FIG. 4(a) is a schematic illustration of a first primary stack and FIG. 4(b) is a schematic illustration of a jacketed first secondary stack.

At stage 56, the plurality of formed drawn stacks are stacked together in a hexagonal array which may be referred to as a secondary stack 110. The secondary stack is arranged in accordance with a desired arrangement. The hexagonal array may also be referred to as a honeycomb array. 199 of the drawn stacks are stacked together to form the secondary stack. An embodiment of the secondary stack is shown in FIG. 4(*b*).

The secondary stack may also be referred to as a further stack. The secondary stack may also be referred to as a super-lattice. The desired arrangement of the secondary stack may be referred to as a secondary stack arrangement.

In some embodiments, stacking the plurality of primary stacks to form the secondary stack includes controlling the orientation of the primary stacks. In some embodiments, stacking the plurality of stacks includes aligning edges of two or more adjacent primary stacks thereby to provide a secondary stack in accordance with a secondary stack arrangement. In some embodiments, stacking of the plurality of stacks into the secondary arrangement include rotating or otherwise orientating the primary stacks.

In some embodiments, the secondary stack is a stack of identical or near-identical components.

Whilst a hexagonal or honeycomb array is described, in some embodiments, any stagger row arrangement or suitable packing arrangement may be used.

In some embodiments, the stacking of the drawn primary stacks in the secondary stack arrangement forms a repeating arrangement of rods.

The drawn primary stacks may be considered as primary unit cells, then the shape of said unit cells (which in this embodiment is hexagonal) may allow the unit cells to be easily stacked. The secondary stack may be considered as a tiling of the primary unit cells, such that the primary unit cells are tiled such that the fill space. The primary unit cells may be arranged in a tessellated arrangement.

In other embodiments, the primary unit cells may have any regular geometric shape that may be stacked together, for example a rectangle, a parallelogram, a rhombus, or a square.

In further embodiments, each primary unit cell has an interlocking shape (for example, a shape that may be considered to resemble a jigsaw piece). In such embodiments, at stage 56, the unit cells are arranged such that they interlock.

In some embodiments, each of the plurality of primary stacks formed at stage 52 are formed in the same stack arrangement to allow for stacking of the primary stacks at stage 56. In some embodiments, each of the plurality of primary stacks at stage 52 are formed to have the same selected shape to allow for stacking of the primary stacks at stage 56.

At stage 58, the secondary stack is placed in a jacket tube. In this embodiment, the inner/outer diameter of the silica jacket is 19/25 mm. Packing glass is added between the jacket tube and the secondary stack to hold the secondary stack within the jacket tube. The packing glass comprises solid glass rods, for example, pure silica canes. The solid glass rods are not configured to transmit light. The jacketed stacked preform formed at stage 58, has 11,343 cores. The secondary stack, jacket tube and packing glass produced at step 58, may be considered to provide a final preform for an imaging fibre.

At stages 60 and 62, the final preform is drawn down twice using the fibre drawing apparatus 10 or further drawing apparatus.

At stage 60, the final preform is drawn down to a 4.3 mm diameter. During the drawing process, the secondary stack is heated and rods of each primary stack become fused to neighbouring rods from other primary stacks at the points at which they touch. Interstitial air gaps remain between rods of different primary stacks, and between rods within each secondary unit cell.

A vacuum attachment is used to suck out air from gaps between the cores, removing the gaps between the rods to provide a final assembly. The vacuum is applied to collapse interstitials and to make the preform. In the present embodiment, this step is performed at drawing stage 60. In other embodiments, This step is performed at drawing stage 54.

While it is described that the final preform is first drawn down to a 4.3 mm diameter, any suitable diameter for the final preform may be used. In some embodiments, stage 60 and stage 62 are not separate stages of drawing down but are performed as one single drawing down process to form the imaging fibre.

At stage 62, the drawn preform is further drawn down using fibre drawing apparatus 10, or a further drawing apparatus to form an imaging fibre. At stage 62, different sizes of imaging fibres can be formed.

When drawing the secondary stack down at stage 60 or the final preform at stage 62, choice of furnace temperature is important. In some embodiments, the temperature is controlled at stage 60 and/or stage 62 to be between 1800 and 2000 degrees Celsius. In other embodiments, the temperature is controlled to be between 1850 and 1950 degrees Celsius. In other embodiments, the temperature is controlled to be between 1890 and 1910 degrees Celsius.

The drawing down process of stage 62 results in an optical fibre apparatus, which in this embodiment is a coherent imaging fibre. The coherent imaging fibre may be configured to transmit visible, infrared and/or ultraviolet light. The coherent imaging fibre may be considered to form an array of light guiding elements (the light guiding elements in this case are the cores of the rods that have been drawn to form the coherent imaging fibre), arranged in a repeating arrangement of light guiding elements. As described above, surrounding the light guiding elements with cladding rods may reduce cross-talk between the light guiding elements.

In some circumstances, there may be some deformation of the primary or secondary stacks when they are drawn. For example, there may be some twisting of the stacks. In some circumstances, some types of distortion may prevent such an interlocking unit cell from successfully interlocking with other unit cells. It may be the case that the use of a regular shape that is not interlocking (for example, a square or hexagon) may result in greater tolerance to distortions.

In the above embodiments, two stacking steps, a primary stacking step and a secondary stacking step, are performed. In some embodiments, one or more intermediate stacking and/or drawings steps are performed. In some embodiments, an intermediate stacking step is performed such that primary stacks are stacked together in accordance with an intermediate stacking arrangement to form intermediate stacks and the intermediate stacks are stacked together to form the secondary stack.

A further stage of forming the optical fibre apparatus includes performing a sealing process on the end face of the fibres so that bacteria and other material cannot enter. The sealing process may be performed in several different ways, in accordance with embodiments. In some embodiments, the holes can be plugged using a sealing material, for example, resin or glue, which when cured allows the end face to be polished flat. The sealing material is at least partially optically transparent. The sealing material is transparent to light having a wavelength in the spectral region of interest. The sealing material may also be of a high optical quality. The sealing material may be for example, resin, glue, glass with a low melting temperature or sol-gel.

In further embodiments, the end of the fibre either is collapsed on a fibre tapering rig or otherwise. This may also increase the resolution as the cores would be closer together at the end face. By using doped cores as discussed above, these would act as weak light guides over the brief collapsed region to the end face, maintaining coherence of the image. In some embodiments, another option is to use a fibre splicer to melt the end face into a bead of solid glass. The bead could potentially act as a lens and if unwanted could be polished back leaving only a "window" of glass on the end face.

In other embodiments, an optical component, for example an end window or a lens is attached to the end face of the fibre bundle. Any suitable attachment method may be used, for example, bonding or fusing. The optical component may be sized to cover the whole of the face of the fibre bundle.

In other embodiments, the sealing process includes using an optical element, for example a lens or window, as an end-seal for the jacket of the optical fibre. The jacket of the optical fibre is terminated at either end with the optical component.

By performing an appropriate finishing or sealing step on the imaging fibre the potential for contamination may be reduced, for example, when used in a medical environment.

The main advantages of the manufactured fibres may be an increased resolution at any wavelength transmittable in silica, as well as the extremely broad functional spectral range. They may also be made from pure silica glass compared to the doped material commonly used in the cores of coherent fibre bundles, which may allow a less expensive fibre to be made.

In some embodiments, in addition or alternatively to controlling the temperature during the drawing of the primary stack, the tension is controlled during the process of drawing the primary stacks, to be in a range corresponding to a force between 300 gram-force to 1000 gram-force, optionally between 500 gram-force and 800 gram-force. In some embodiments, in addition or alternatively to controlling the temperature during the drawing of the secondary stack, the tension is controlled during the drawing of the secondary stack to be in a range between 300 gram-force to 1000 gram-force, optionally between 500 gram-force and 800 gram-force.

Although the tension above, is provide in the metric unit of a gram-force, it will be understood that the equivalent tension ranges in Newtons are also suitable, in that either the first or second tension may be in a range between 2.94 Newtons to 9.81 Newtons, optionally between 4.90 Newtons to 7.85 Newtons.

At stage 52, the plurality of core rods 102 and cladding rods 104 are arranged into primary stacks 100. FIGS. 4(*a*), 5(*a*) and 6(*a*) illustrate stacking arrangements of the primary stack, in accordance with embodiments. The primary stacks have an at least a partial outer layer of cladding rods to provide separation between core rods of respective adjacent stacks when stacked together.

The primary stacks illustrated in FIGS. 4(*a*), 5(*a*) and 6(*a*) are hexagonal-shaped. In some embodiments, the primary stacks have at least one core rod positioned at an outer edge of the primary stack. In such embodiments, core rods present at an outer edge of the arrangement may be referred to as outer edge core rods and core rods that are not at an outer edge of the arrangement may be referred to as inner core rods, such that the primary arrangement is described as an arrangement of inner core rods, edge core rods and cladding rods. In some embodiments, the primary stacks have no cores positioned at an outer edge and thus no edge core rods.

FIG. 4(*a*) is a first primary stack arranged in a first primary stacking arrangement, in accordance with embodiments. A cladding rod 104 and a core rod 102 are indicated. A complete outer layer 122 of cladding rods is provided around the exterior of the first primary stacking arrangement. When the primary stacks are stacked together in the secondary stack, the complete outer layer of cladding rods of each of the primary stacks provides separation between core rods in adjacent primary stacks.

The first primary stack arranged in the first primary stack arrangement has no edge core rods. The outer layer of the primary stack is a layer of one rod thickness and in this embodiment, said outer edge comprises cladding rods and no core rods. All the inner core rods of the first primary stack are thus surrounded by cladding rods.

FIG. 4(*b*) shows the final jacketed arrangement that include a secondary stack comprising a plurality of primary stacks 100*a*, formed as described with reference to FIG. 4(*b*), a jacket tube 126 and packing glass 128. The complete outer layer of cladding rods is seen in the arrangement of FIG. 4(*b*).

In some embodiments, as shown in FIG. 4(*b*), all primary stacks used in the secondary stack are identical. In some embodiments, more than one type of primary stack are used to form the secondary stack. In such an embodiment, a primary stack formed with no edge core rods may be placed adjacent to a primary stack formed with edge core rods, such that the core rods remain separated when placed in the secondary stack.

Figure 5:
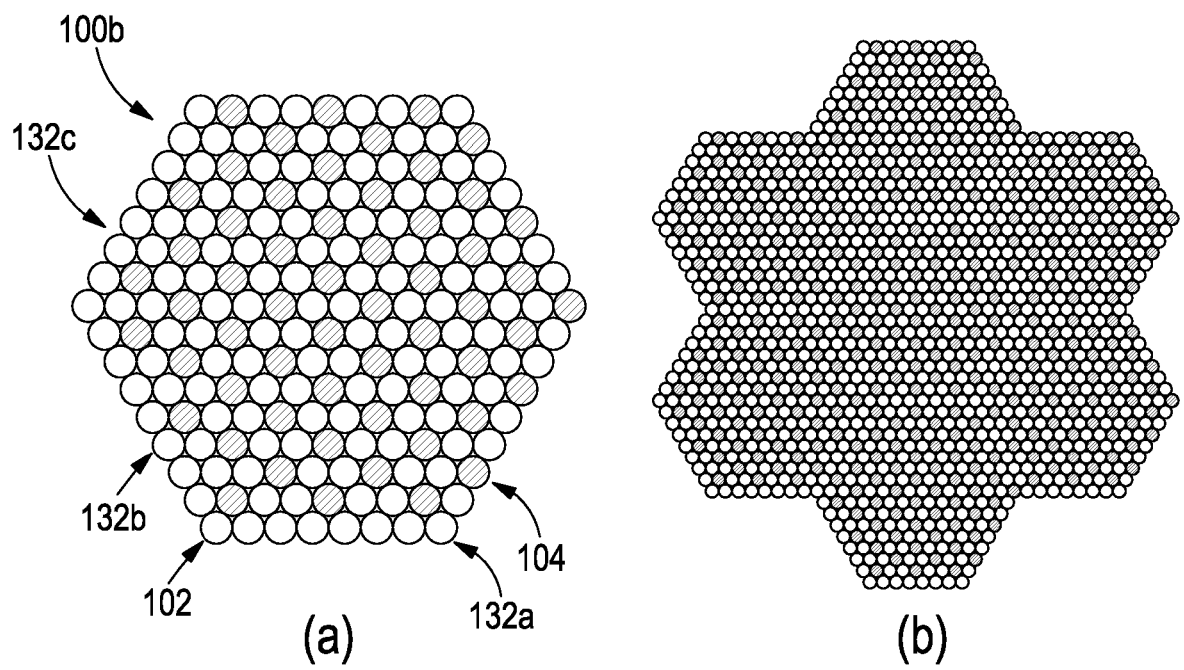
FIG. 5(a) is a schematic illustration of a first primary stack and FIG. 5(b) is a schematic illustration of part of a second secondary stack.

FIG. 5(*a*) is a second primary stack 100*b* arranged in a second primary stacking arrangement, in accordance with embodiments. A cladding rod 104 and a core rod 102 are indicated. Like the primary stack 100*a* of FIG. 4(*a*), the primary stack 100*b* of FIG. 5(*a*) is a hexagon, and thus has six outer edges. Three of these outer edges are formed from cladding rods and may be referred to as outer cladding edges. If the six outer edges of the hexagon are numbered sequentially, in a clockwise direction starting from the upper edge, the first outer cladding edge 132*a* is provided at the fourth edge of the primary stack, a second outer cladding edge 132*b* is provided at the fifth edge of the primary stack and a third outer cladding edge 132*c* is provided at sixth edge of the primary stack.

The second primary stack 100*b* arranged in the second primary stack arrangement has more than one edge core rod. In further detail, three edges of the second primary stack 100*b* have more than one edge core rod. The second primary stack 100*b* of FIG. 5(*a*) may be described as being an arrangement of inner core rods, outer core rods and cladding rods. The inner core rods are thus surrounded by cladding rods, in the second primary stack. As illustrated in FIG. 3, inner core rods are surrounded by 6 cladding rods. The outer core rods are partially surrounded by the cladding rods, in the second primary stack 100*b*. As illustrated in FIG. 3, the edge core rods are surrounded by 4 cladding rods By stacking two or more primary stacks that are arranged according to the second primary stacking arrangement, the cladding edges of the primary stacks co-operate to provide separation between core rods of adjacent stacks and to prevent edge cores of adjacent primary stacks touching.

Although three or more edges of the second primary stacking arrangement are outer cladding edges, a different number of outer cladding edges may be provided.

FIG. 5(b) illustrates part of a secondary stack formed from primary stacks arranged in the second primary stacking arrangement. As can be seen from FIG. 5(b), when in the secondary stack, the outer edges 132a, 132b, 132c of adjacent primary stacks co-operate to provide separation between core rods of adjacent primary stacks thereby to provide separation between core rods of adjacent primary stacks.

The second primary stacking arrangement may offer advantages in that the boundaries between primary stacks may have a reduced effect on imaging quality. However, forming the secondary stack may be more difficult, as the orientation of the primary stacks must be controlled to provide separation between core rods of adjacent stacks.

The primary stack 100b may be considered to be an asymmetrical primary stack, the asymmetry provided by having edges of core rods on only one side of the hexagon.

Figure 6A:
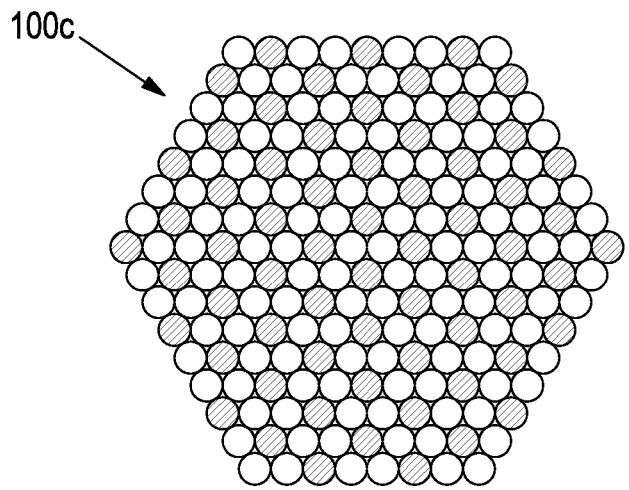
FIG. 6(a) is a schematic illustration of a third primary stack and FIG. 6(b) is a schematic illustration of part of a third secondary stack.

FIG. 6(a) is a third primary stack 100c arranged in a third primary stack arrangement. In contrast to the first and second primary stack arrangements described above, the third primary stack arrangement is an irregular shaped hexagon. In further detail, the third primary stack 100c has six sides, with three sides having a first length and three sides having a second length. In this embodiment, the first, third and fifth edges of the third primary stack are 9 rods in length and the second, fourth and sixth edges of the third primary stack are 8 rods in length.

Figure 6B:
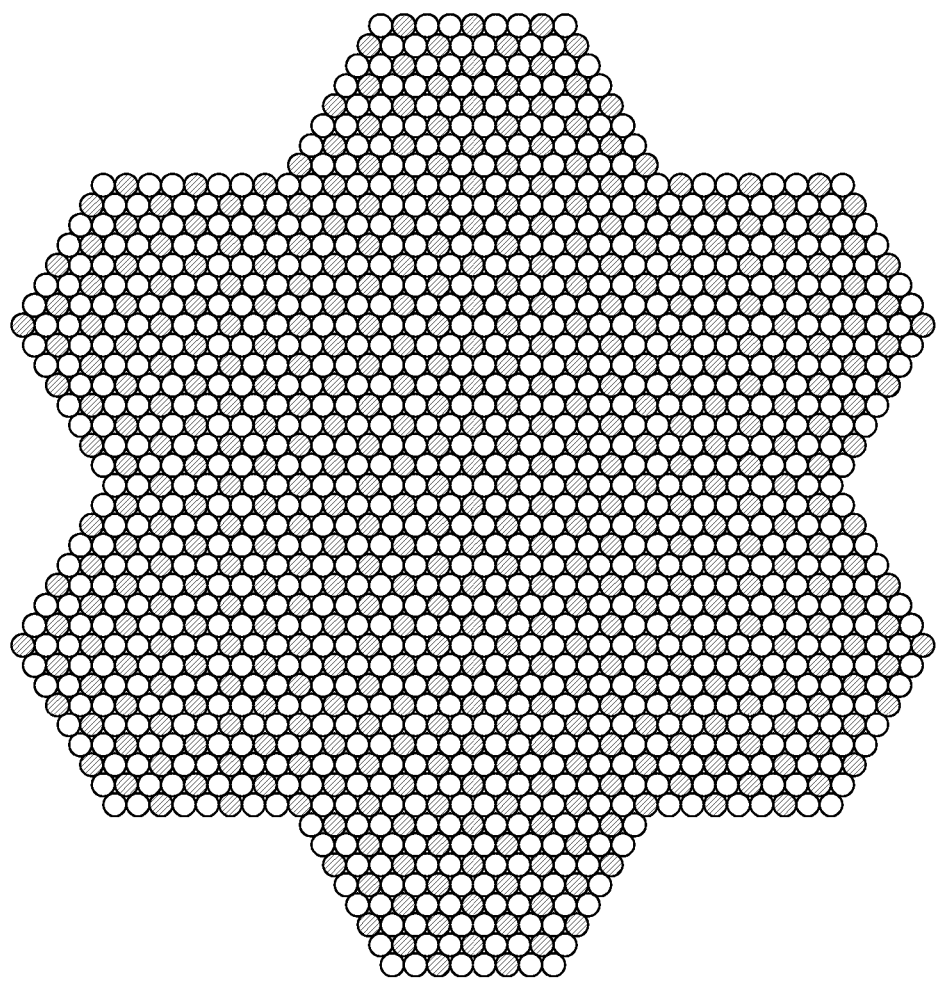

FIG. 6(b) illustrates part of a secondary stack formed from primary stacks arranged in the third primary stacking arrangement. As can be seen from FIG. 6(b), the outer edges of the primary stacking arrangement of adjacent stacks co-operate to provide separation between core rods of adjacent stacks. FIG. 6(b) shows an example of a homogeneous distribution of core rods and cladding rods. Inner core rods of the distribution are completely surrounded by cladding rods and outer (edge) core rods of the distribution are partially surrounded.

The third primary stacking arrangement may provide the advantage of a seamless secondary stack. However, forming the secondary stack may be more difficult, as the orientation of the primary stacks must be controlled to provide separation between core rods of adjacent stacks.

The third primary stack 100c may be considered to be an asymmetrical primary stack, the asymmetry provided by having the irregular sides of the primary stack 100c. The secondary stack formed using the asymmetrical primary stack 100c is symmetrical.

It will be understood that the primary stacks of FIGS. 5(a) and 6(a) are arranged in a secondary stacking arrangement, as shown in FIG. 4(b), with a jacket and packing glass to form a fibre preform.

By providing separation between core rods of adjacent stacks, inter-core coupling may be reduced.

In some embodiments, the primary stack arrangement is such that the secondary stack comprises a homogenous distribution of core rods and cladding rods, for example, as shown in FIG. 6(b). In some embodiments, the primary stack arrangement is non-symmetrical distribution of core rods and cladding rods, for example, as shown in FIGS. 5(b) and 5(c). In some embodiments, the primary stack arrangement is a non-symmetrical distribution of core rods and cladding rods, and the secondary stack arrangement is a symmetrical distribution of core rods, as shown in FIG. 6(b).

In some embodiments, the primary stack is a regular array of core rods and cladding rods and optionally, the secondary stack is a regular array of core rods and cladding rods.

In some embodiments, the secondary stack may be considered to an arrangement of inner primary stacks and outer primary stacks where inner primary stacks are surrounded on all sides by other primary stacks and outer primary stacks are on the edge of the secondary stack. In some embodiments, as illustrated in FIG. 5(b) and FIG. 6(b), edge core rods of inner primary stacks are completely surrounded by core rods when the inner primary stack is in the secondary stack.

As illustrated in FIG. 4(b), FIG. 5(b) and FIG. 6(b), in some embodiments, the secondary stack is a repeating pattern of core rods and cladding rods. In some embodiments, the repeated unit is the primary stack, for example, FIG. 4(b). In some embodiments, the primary stacks stack together such that the repeated unit is a smaller unit than the primary stack. For example, FIG. 6(b) shows a unit cell comprising a single core rod surrounded by 6 cladding rods. The primary stacks stack together to produce a secondary stack that can be generated using this unit cell.

FIGS. 4(b), 5(b) and 6(b) further illustrate that, in the secondary stack, each core rod is separated from its nearest neighbouring core rod by at least one cladding rod.

Although FIGS. 4, 5 and 6 show hexagonal-shaped primary stack arrangements that may be described as having a selected shape that is a hexagon, in some embodiments, the selected shape is any suitable shape, for example, a square, a rectangle, a parallelogram, a rhombus.

In further embodiments, more than one type of doped preform may be used at stage 50a of the process. In such, embodiments, core rods with different refractive index distributions are arranged with the cladding rods in the primary stack. The core rods formed from the doped core preforms are then stacked, in a primary arrangement, such that no neighbouring cores have the same refractive index distribution.

By forming a fibre such that no neighbouring core regions have the same refractive index, inter-core coupling may be further reduced. In further detail, coupling between neighbour core rods may be decreased, as light may propagate differently in each type of core and may be less able to move between neighbouring cores.

Figure 7:
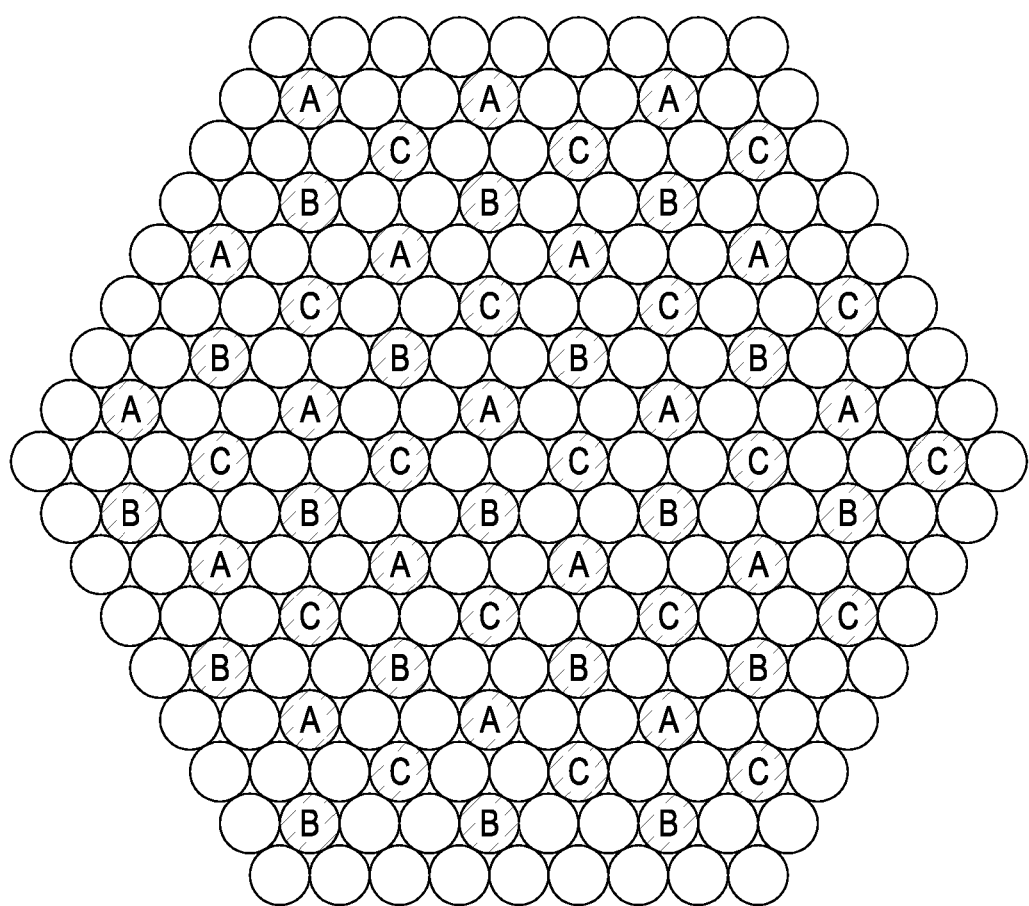
FIG. 7 is a schematic illustration of a primary stack arrangement using more than one type of core rod.
Figure 8:
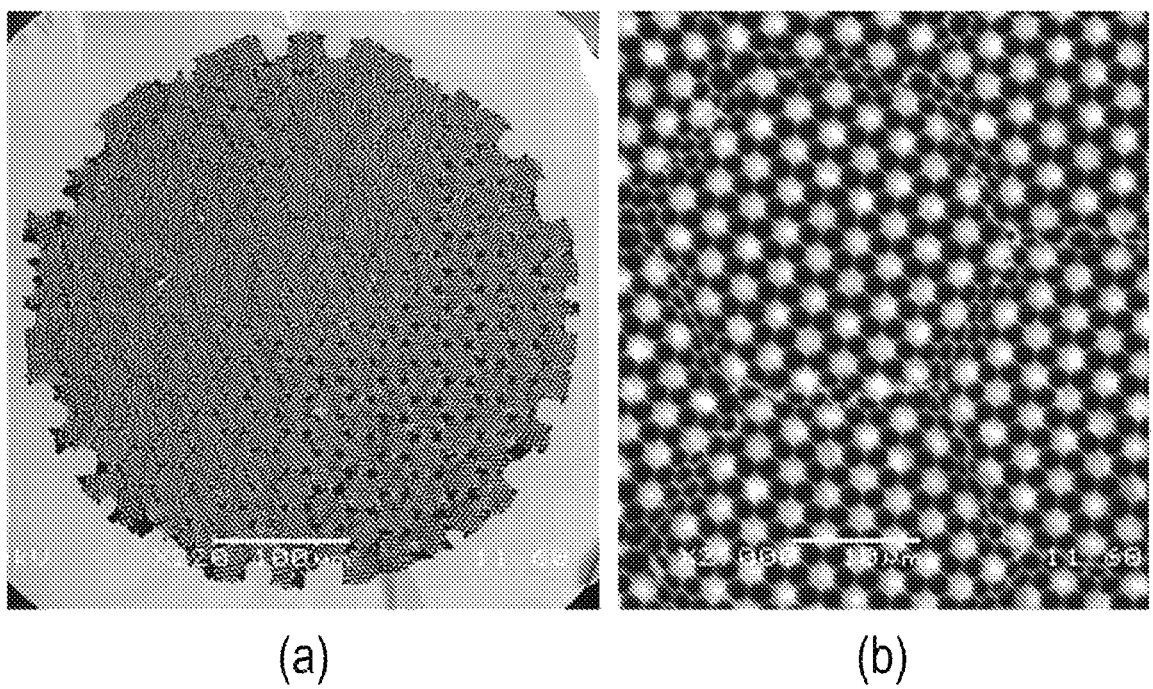
FIG. 8(a) is an image obtained from a scanning electron microscope of a first fibre and FIG. 8(b) is an expanded view of the first fibre.

FIG. 7 shows a primary stack, in accordance with embodiments, formed using cladding rods and three different types of cores rods, each type of core rod having a different refractive index distribution. The core rods are drawn from telecoms-grade preforms.

Each type of core rod has a germanium doped step index core of a different diameter. In an embodiment, the ratio of core to cladding in these preforms were 0.35, 0.42 and 0.48. The effective indices of nearest neighbours are prevented from being identical through the arrangement of core rods in the primary and secondary stacks.

The refractive index distributions may be characterised by the effective refractive index. The different types of core rods are represented by letters A, B and C. The core rods and cladding rods are arranged in the primary stack such that the nearest neighbour of each core rod has a different refractive index distribution or effective refractive index. FIG. 7 illustrates a primary arrangement such that nearest neighbours of each core rod have different effective refractive indices.

In this embodiment, different ratios of core to cladding of the core rods provides different refractive index distributions for the core regions. It will be understood that different refractive index distributions of core regions may be achieved using different methods or compositions.

In some embodiments, core rods are formed from preforms having an inner core portion and an outer core portion wherein the inner and outer core portions have different refractive index distributions. The core rods drawn from said preforms therefore have non-uniform refractive index distributions. In some embodiments, different core rods are used such that the formed fibre has nearest neighbouring core regions with different ratios of inner core size to outer core size. The inner and outer core regions may be defined by the boundaries of the internal refractive index distribution and the boundary to the cladding regions respectively.

In some embodiments, the inner core region is doped and the outer core region is not doped.

For core rods that have non-uniform refractive index distributions, properties of light transmitted down the core regions formed from said core rods will travel in accordance with the non-uniform index distribution.

In some embodiments, the core rods have no doped region. In some embodiments, the core rods have a cladding, an inner core region and an outer core region. In some embodiments, the inner core region comprises a doped region such that the inner core region has a higher refractive index than the outer core region. In some embodiments, the core region is doped such that the core region comprises a step index profile. In some embodiments, the core region is doped such that the core region comprises a graded index profile.

In the above, the terms core rod and cladding rods are used. A core rod may refer to a rod that comprises a central portion comprising at least one material, the central portion being characterized by a first refractive index profile, and a cladding comprising a second material characterised by a second refractive index profile, wherein the cladding has a lower effective refractive index than the effective refractive index of the first portion, thereby to confine light to the central portion.

In the above described embodiments, cladding rods are hollow silica tubes. In some embodiments, a cladding rod may refer to a rod that comprising a core material characterised by a first effective refractive index profile and a cladding comprising a cladding material characterised by a second effective refractive index, wherein the second effective refractive index is higher than the first effective refractive index.

It will be understood that FIG. 7 is illustrative only, and that other arrangements of core rods are possible such that the nearest neighbour of each core rod has a different refractive index distribution.

FIG. 8 to 13 show experimental results obtained using two manufactured fibres. In particular, the results using the fibres formed using three different types of core rod.

FIG. 8(a) shows scanning electron microscope images of a manufactured fibre. FIG. 8(b) is an expanded view of the region of the manufacture fibre of FIG. 8(a). It will be understood, that although core rods are represented as grey circles and cladding rods represented as white circles in FIGS. 3 to 7, in the microscopic images of FIGS. 8(a) and 8(b) the core rods appear white and the cladding rods appear black. The cores of the manufactured fibre are about 1.9 µm in diameter and a core-core separation is about 3.5 µm (measured centre to centre).

In the following, further discussion of the fabrication process and results obtained in accordance with embodiments is provided.

Fabrication

First, the basic elements of the structure were all drawn to 1.85 mm outer diameter. The capillaries were drawn from F300 silica glass tubes, and the cores were from a set of 3 telecoms-grade preforms, each with a germanium doped step index core of different diameter. The ratios of core to cladding in these preforms were 0.35, 0.42 and 0.48. Using doped material in this way may prevent the effective indices of nearest neighbour cores being identical thus may reduce inter-core coupling.

These canes and capillaries were stacked to form a 57-core array, in the first primary stacking arrangement, as shown in FIG. 4(a). This stack was drawn unjacketed to a flat-to-flat thickness of 1.2 mm.

199 of the 57-core canes were then stacked in a hexagonal array, inserted in a silica jacket of inner/outer diameters of $19/25$ mm, and packed at the edges with pure silica canes to produce the preform with 11,343 cores. A preform of this type is illustrated in FIG. 4(b). This was drawn down to 4.3 mm diameter canes before finally being drawn to fibres of several different sizes.

Two different sizes of the air-clad fibre are discussed in the following: a first fibre, a 535 µm diameter variant with the same core spacing of roughly 3.5 µm and a second fibre, a 335 µm diameter fibre for high resolution, short wavelength applications. The first fibre was compared to a known fibre, the Fujikura's FIGH-30-650s. As described above, FIG. 8 shows a cross section of a manufactured fibre, in particular a cross section of the first fibre (the 535 µm variant).

Characterisation

The characterization of the fibre was done in three parts and all testing was carried out with over a meter length of air-clad fibre, coiled to a radius of around 15 cm.

A. USAF Test Target Images

US air force test targets were used to assess the maximum resolution of the fibres. This was done in a zero working distance imaging setup where the target was back illuminated by a supercontinuum white light source. Bandpass filters were used at the output end of the fibres to produce the images in FIGS. 9 and 10.

Figure 9:
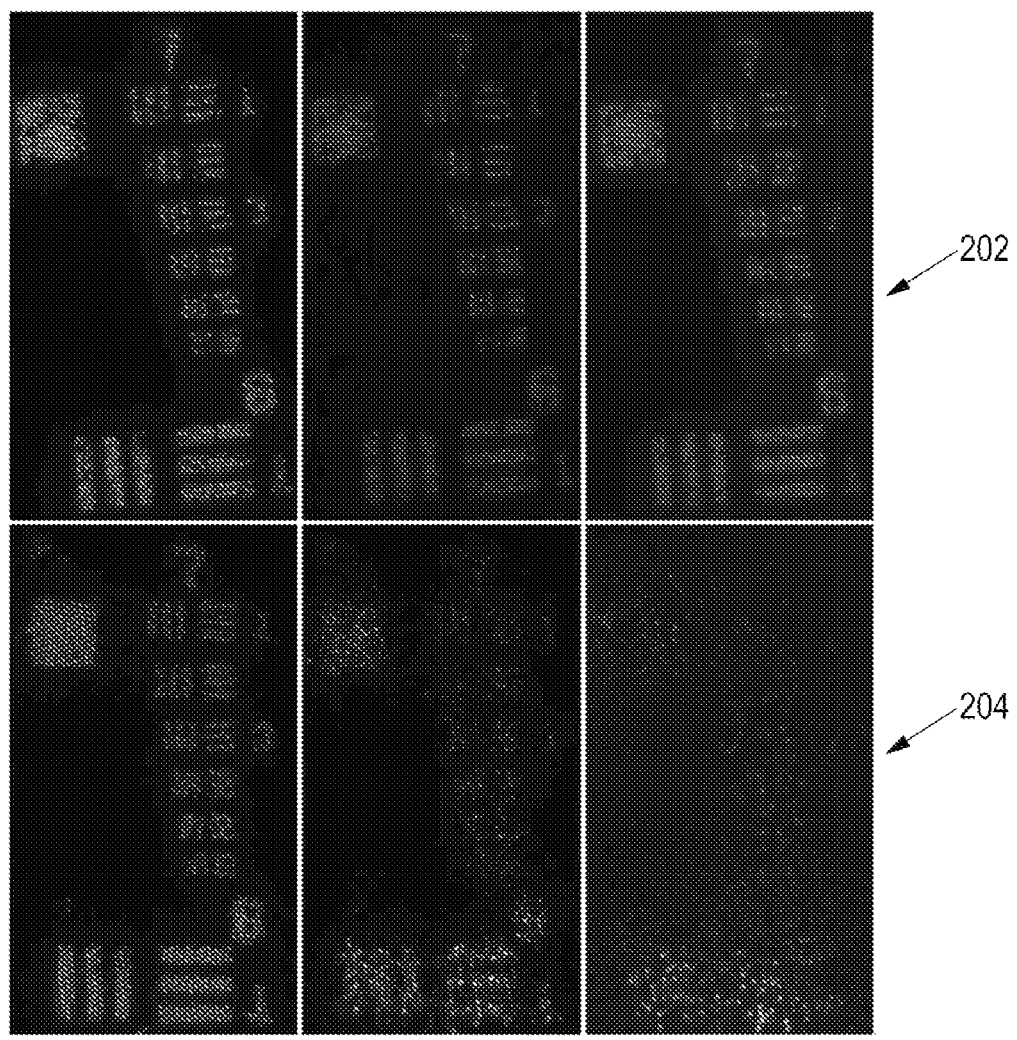
FIG. 9 shows experimental imaging results of test images obtained using a first fibre, together with comparative results obtained using a known fibre.

FIG. 9 shows a set of these images taken across a range of wavelengths from 500 to 1000 nm with both the first fibre (the 535 µm air clad fibre) formed in accordance with embodiments, and the known fibre, FIGH-30-650S. In further detail, the upper row of images are obtained using the first fibre and, from left to right, are obtained at wavelengths 500 nm, 850 nm and 1000 nm. The lower row of images are obtained using the second, known fibre, and, from left to right are obtained at wavelengths 500 nm, 850 nm and 1000 nm.

FIG. 9 shows a comparison of USAF test target images from the 535 µm air-clad imaging fibre and Fujikura's FIGH-30-650S, taken using a silicon CCD camera. The individual line widths shown in group seven range from 2.19 µm to 3.91 µm.

Group 7 is shown to the top right of each image, with element 1 of group 6 at the bottom. In all images taken using our air-clad fibre element 3 of group 7 is clearly visible. This corresponds to a resolution of 161.3 line pairs per millimetre (LP/mm), or 3.1 µm. With the FIGH-30-650S element 3 of group 7 only be visible using light of wavelength 700 nm or less, and even element 1 of group 6 (64 LP/mm, or 7.81 µm) is lost past 800 nm.

Figure 10:
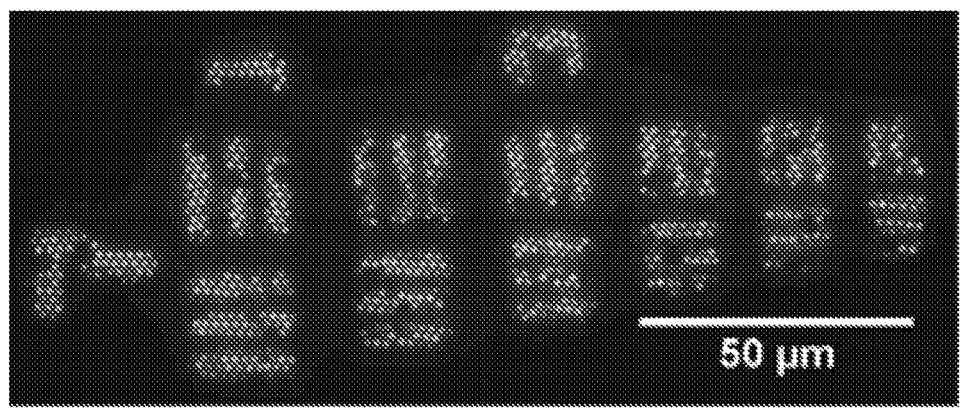
FIG. 10 shows experimental imaging results of test images obtained using a second fibre.

FIG. 10 shows an image of group 7 of a USAF test target taken using the high resolution 335 μm outer diameter air-clad fibre and a 500 nm bandpass filter. FIG. 10 shows the high resolution that may be achievable using these fibres as even element 6 of group 7 (228.1 LP/mm, 2.19 μm) is clearly visible using the 353 μm air clad fibre and 500 nm illumination.

Figure 11:
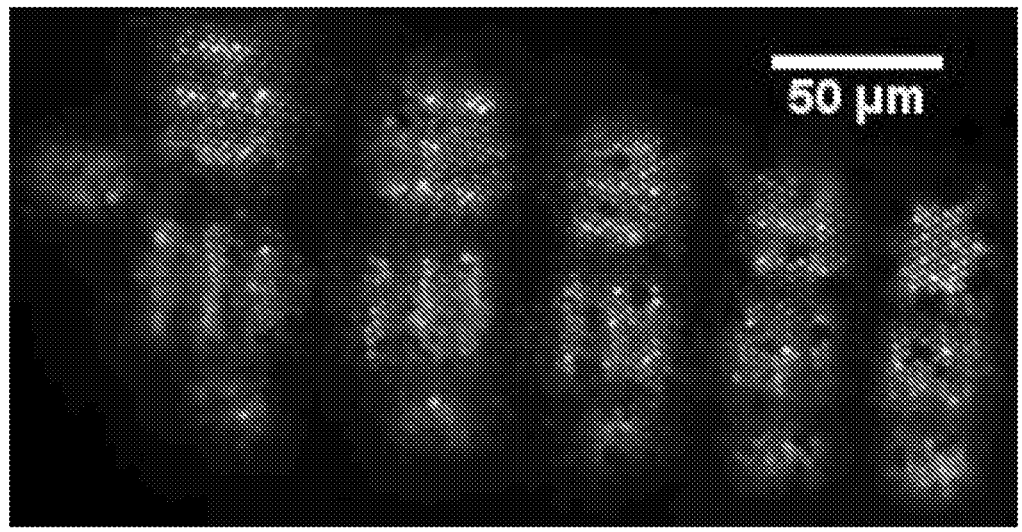
FIG. 11 shows experimental imaging results of test images obtained using the first fibre.
Figure 12:
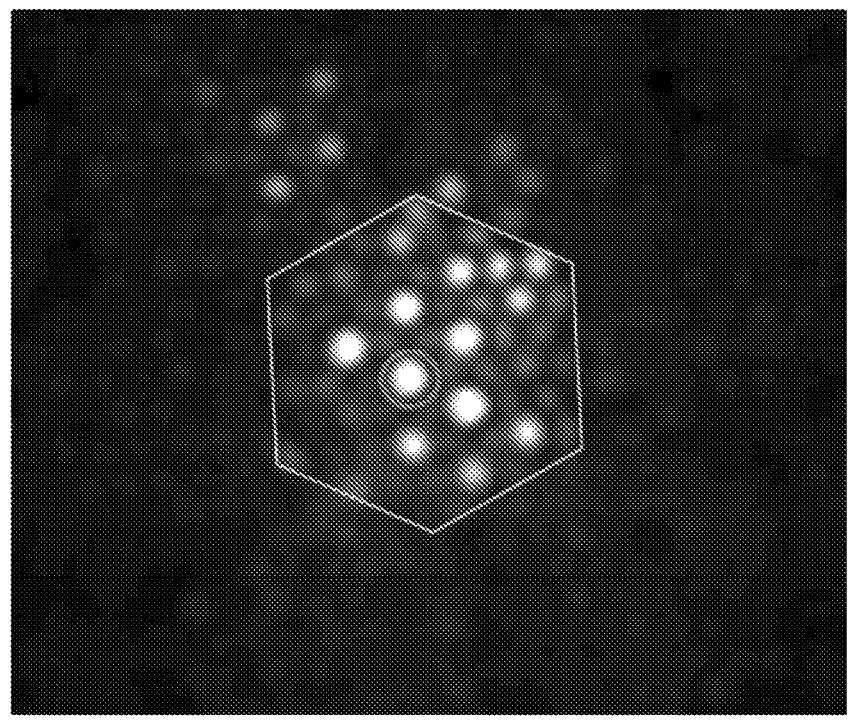
FIG. 12 is an experimental image of a fibre end face.

FIG. 11 is an image of group 6 of a USAF test target taken at 10 1600 nm using the 535 μm air-clad fibre and a SWIR camera. FIG. 11 shows images of group 6 at 1600 nm using the 535 μm version and an infra-red camera to demonstrate the long wavelength characteristics that may be achieved using the air-clad fibre. Although there is loss of resolution due to coupling, the rate at which this occurs with increasing wavelength is far lower than with traditional fibres.

B. Numerical Aperture

The numerical aperture (NA) of a selection of the core of the fibre was found using a knife-edge measurement. The edge of the beam profile was taken as the point where the power drops to 10% of its peak. This was done at two wavelengths by coupling a supercontinuum light source into single cores and filtering the output with 500 and 1000 nm bandpass filters. The NA is 0.41±0.05 and 0.44±0.05 at 500 and 1000 nm respectively.

C. Significance of the Doped Cores

FIG. 11 shows a near-field of the output fibre end face when coupling into the core (circled). The hexagon indicates the boundary of a sublattice stack. By coupling 1200 nm light into the circled core of the 335 μm fibre the image in FIG. 11 was produced.

The coupled families of similarly doped cores, all next-nearest neighbours, are immediately apparent, indicating a strong impact on the coupling characteristics of the structure. Also noted is the drastic reduction in power coupled between cores across the boundary of the sublattice (hexagon) stack due to the double capillary boundary.

Tapered Structures

Coupling between cores may depend on propagation distance as well as core separation and index step. Image resolution may be further improved by locally decreasing the core separation at the distal end, if the affected length is short enough. This may be achieved, without compromising the overall length of an endoscope, by tapering a larger fibre.

An air-clad imaging fibre of outer diameter 600 μm was heated and stretched in a small flame. The narrowed region was cleaved to form a tapered tip 9.5 cm long with a diameter of 310 μm at the endface, attached to 1 m of 600 μm diameter fibre.

Figure 13:
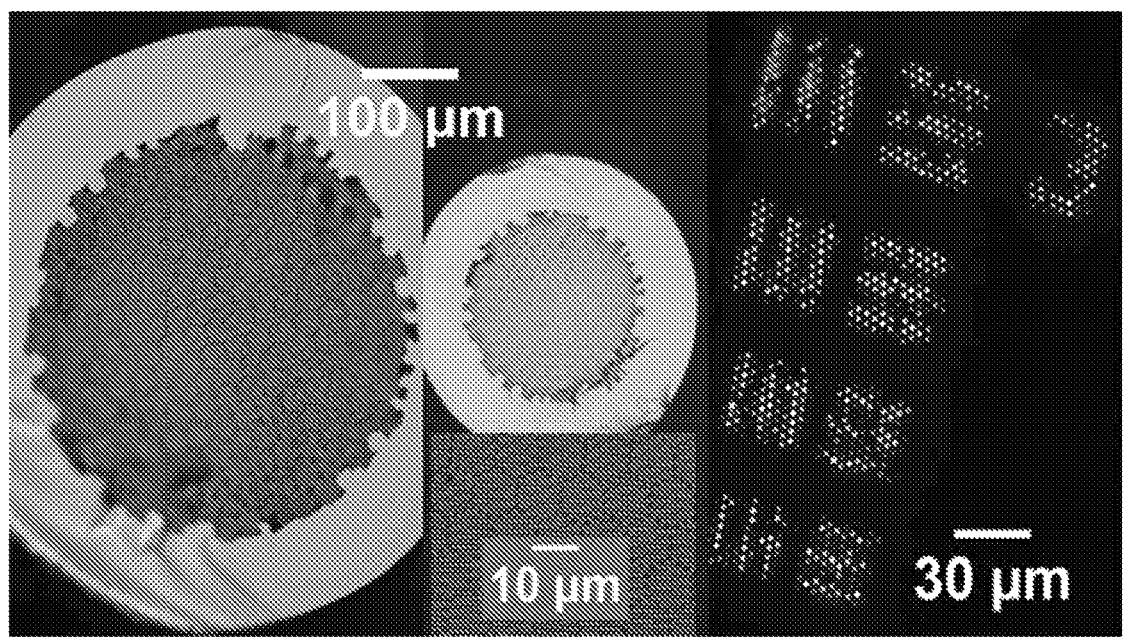
FIG. 13 shows micrographs for transmitted white light.

FIG. 13 shows micrographs for transmitted flood illuminated white light of the untapered (left) and tapered (middle) fibre. The smallest USAF group 7 elements imaged at 500 nm are shown at the right.

The reduced core separation was 1.2 μm, and the air holes have survived the process. Group 7 of a USAF test target placed at the tapered end was imaged via a 500 nm bandpass filter, FIG. 9 (right). Compared to the smaller uniform fibre at the same wavelength (FIG. 10) the elements of group 7 are clearly better resolved. It is noted that the difference in image scales is due to the incidental magnifying effect of the taper.

A technique for the fabrication of air-clad imaging fibres based on index guidance between air and silica has been demonstrated. The fibres may be made for high resolution imaging down to 2 μm, or broadband imaging at 1600 nm of similar resolution to Fujikura's FIGH-30-650S, but double its maximum functional wavelength. It is straightforward to optimize these fibres for maximum resolution at the wavelength required by any application (limited only by the transmission spectrum of the silica itself) by drawing the fibre to a different size.

This technology may provide a platform for the development of the next generation of endoscopic techniques, in, particular those which rely on near infra-red imaging of fluorescent marker dyes and infra-red imaging in industry.

It may be understood that the present invention has been described above purely by way of example, and that modifications of detail can be made within the scope of the invention.

Although above, a first and second stacking stage was described, in further embodiments, any number of multi-stacking iterations may be used. For example, the rods may be stacked and/or drawn down twice, three times, four times, or five times.

In the above embodiments, core rods are made from silica glass, that are either doped or not doped. In some embodiments, the core rods are made from at least one of silica, Ge-doped silica, Fluorine doped silica, boron doped silica, Aluminium doped silica, silicate glass.

In the above embodiments, the cladding rods are hollow silica capillaries. In some embodiments, the cladding rods are made from at least one of silica, Ge-doped silica, Fluorine doped silica, boron doped silica, Aluminium doped silica, silicate glass.

In further embodiments, core rods or core regions have a non-uniform refractive index distribution. At least one of the core rods may have an inner core region and an outer core region, wherein the inner core region comprises a doped core region.

In further embodiments, the imaging fibre resulting from the process of FIG. 2 is packaged with a plurality of sensing fibres and a capillary tube to form a multi-functional fibre apparatus. The imaging fibre, sensing fibres and capillary tube are placed within a further glass or polymer tube, which may be referred to as a package. The further glass or polymer tube may be shorter than the imaging fibre, sensing fibres and capillary tube. The package contains the imaging fibre, sensing fibres and capillary tube, which are fixed in place using epoxy.

Each feature disclosed in the description and (where appropriate) the claims and drawings may be provided independently or in any appropriate combination.

The invention claimed is:

1. A method of forming an imaging fibre apparatus comprising:
    arranging core rods and cladding rods to form at least one primary stack, each primary stack of the at least one primary stack comprising a plurality of core rods and cladding rods arranged in a primary stack arrangement thereby to form a plurality of core regions within a cladding region wherein the cladding rods comprise capillary tubes such that the cladding region comprises at least in part an air cladding region;
    performing a drawing process to form a plurality of drawn stacks from the at least one primary stack wherein each of the plurality of drawn stacks have a selected shape such that the plurality of drawn stacks stack together in a desired secondary stack arrangement wherein the selected shape comprises at least one of a square, a rectangle, a rhombus, a parallelogram, a hexagon, and a regular polygon;
    stacking the plurality of drawn stacks together in the desired secondary stack arrangement to form a secondary stack;

wherein the primary stack arrangement comprises at least a partial outer layer of cladding rods thereby to provide separation between core regions of respective adjacent stacks of the secondary stack; and performing at least one further drawing process to form the imaging fibre apparatus from the secondary stack.

2. The method according to claim 1, wherein the drawing process comprises: drawing the at least one primary stack to form at least one drawn primary stack and cutting the at least one drawn primary stack.

3. The method according to claim 1, wherein the primary stack arrangement is such that one or more edges of respective adjacent drawn stacks co-operate in the desired secondary stack arrangement to provide said separation between core regions of said respective adjacent drawn stacks.

4. The method according to claim 1, wherein the primary stack arrangement is such that each primary stack of the at least on primary stack comprises at least one outer edge comprising at least one cladding rod.

5. The method according to claim 1, wherein the primary stack arrangement is such that each primary stack of the at least on primary stack comprises one or more outer edges of cladding rods.

6. The method according to claim 1, wherein the primary stack arrangement is such that each primary stack of the at least on primary stack comprises an outer layer of cladding rods.

7. The method according to claim 1, wherein the primary stack arrangement and/or the desired secondary arrangement comprises a regular array of core rods and cladding rods.

8. The method according to claim 1, wherein the primary stack arrangement is such that the secondary stack comprises a substantially homogenous distribution of the plurality of core regions within the cladding region and/or wherein the primary stack arrangement is such that the secondary stack comprises a non-symmetrical distribution of the plurality of core regions within the cladding region.

9. The method according to claim 1, wherein the primary stack arrangement is such that the secondary stack comprises a non-symmetrical distribution of core rods and cladding rods and the desired secondary stack arrangement is such that the secondary stack comprises a symmetrical distribution of core regions.

10. The method according to claim 1, wherein the selected shape comprises an irregular shape.

11. The method according to claim 1, wherein the primary stack arrangement comprises at least one of:
a hexagonal packing arrangement, a honeycomb arrangement, a hexagonal lattice arrangement, and a staggered row arrangement.

12. The method according to claim 1, wherein for each primary stack of the least one primary stack, the respective plurality of core rods and respective plurality of cladding rods are arranged in the primary stack arrangement such that each core region of the plurality of core regions is at least partially surrounded by cladding rods.

13. The method according to claim 1, wherein the primary stack arrangement is such that each core rod is separated from its nearest neighbour core rod by at least one cladding rod.

14. The method according to claim 1, wherein the primary stack arrangement and/or desired secondary stack arrangement is such that, for each core region of the plurality of core regions, the nearest-neighbour core region for each core region comprises a different refractive index distribution to each core region.

15. The method according to claim 1, further comprising performing a sealing process on an end region of the imaging fibre apparatus.

16. The method according to claim 1, further comprising: controlling a first drawing temperature at which the drawing process of the at least one primary stack is performed and/or controlling a further drawing temperature for the at least one further drawing process.

17. The method according to claim 1, further including:
forming at least one imaging fibre apparatus comprising core regions separated by cladding rods arranged to at least partially surround said core regions; and
containing the at least one imaging fibre apparatus together with at least one further optical fibre or at least one capillary tube in a package.

18. The method according to claim 1, further including placing the secondary stack in a jacket to form a preform and performing a drawing process on the preform.

19. The method according to claim 1, wherein the primary stack arrangement is such that each core rod is separated from its nearest neighbour core rod by at least one cladding rod when stacked in the secondary stack.

20. A method of forming an imaging fibre apparatus comprising:
arranging core rods and cladding rods to form at least one primary stack, each primary stack of the at least one primary stack comprising a plurality of core rods and cladding rods arranged in a primary stack arrangement thereby to form a plurality of core regions within a cladding region wherein the cladding rods comprise capillary tubes such that the cladding region comprises at least in part an air cladding region;
performing a drawing process to form a plurality of drawn stacks from the at least one primary stack wherein each of the plurality of drawn stacks have a selected shape such that the plurality of drawn stacks stack together in a desired secondary stack arrangement;
stacking the plurality of drawn stacks together in the desired secondary stack arrangement to form a secondary stack;
wherein the primary stack arrangement comprises at least a partial outer layer of cladding rods thereby to provide separation between core regions of respective adjacent stacks of the secondary stack such that the secondary stack comprises a non-symmetrical distribution of core rods and cladding rods and the desired secondary stack arrangement is such that the secondary stack comprises a symmetrical distribution of core regions; and
performing at least one further drawing process to form the imaging fibre apparatus from the secondary stack.

21. A method of forming an imaging fibre apparatus comprising:
arranging core rods and cladding rods to form at least one primary stack, each primary stack of the at least one primary stack comprising a plurality of core rods and cladding rods arranged in a primary stack arrangement thereby to form a plurality of core regions within a cladding region wherein the cladding rods comprise capillary tubes such that the cladding region comprises at least in part an air cladding region;
performing a drawing process to form a plurality of drawn stacks from the at least one primary stack wherein each of the plurality of drawn stacks have a selected shape such that the plurality of drawn stacks stack together in a desired secondary stack arrangement;

stacking the plurality of drawn stacks together in the desired secondary stack arrangement to form a secondary stack;

wherein the primary stack arrangement comprises at least a partial outer layer of cladding rods thereby to provide separation between core regions of respective adjacent stacks of the secondary stack and wherein the primary stack arrangement and/or desired secondary stack arrangement is such that, for each core region of the plurality of core regions, the nearest-neighbour core region for each core region comprises a different refractive index distribution to each core region; and performing at least one further drawing process to form the imaging fibre apparatus from the secondary stack.

* * * * *